United States Patent
Walstrom et al.

(10) Patent No.: US 11,381,243 B2
(45) Date of Patent: Jul. 5, 2022

(54) INTEGRATED CIRCUIT APPLICATIONS USING PARTIAL RECONFIGURATION

(71) Applicant: ALTERA CORPORATION, San Jose, CA (US)

(72) Inventors: Joshua Walstrom, San Mateo, CA (US); Mark Bourgeault, Mississauga (CA)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 16/456,388

(22) Filed: Jun. 28, 2019

(65) Prior Publication Data

US 2019/0393878 A1 Dec. 26, 2019

Related U.S. Application Data

(63) Continuation of application No. 15/425,744, filed on Feb. 6, 2017, now Pat. No. 10,374,609, which is a continuation of application No. 14/310,902, filed on Jun. 20, 2014, now Pat. No. 9,584,129.

(51) Int. Cl.
| | |
|---|---|
| *H03K 19/17756* | (2020.01) |
| *H03K 19/17752* | (2020.01) |
| *H03K 19/0175* | (2006.01) |
| *G06F 13/40* | (2006.01) |
| *G06F 13/42* | (2006.01) |
| *G06F 21/60* | (2013.01) |

(52) U.S. Cl.
CPC .... *H03K 19/17752* (2013.01); *G06F 13/4027* (2013.01); *G06F 13/4282* (2013.01); *G06F 21/602* (2013.01); *H03K 19/017581* (2013.01); *H03K 19/17756* (2013.01); *G06F 2213/0026* (2013.01)

(58) Field of Classification Search
CPC ....... H03K 19/17752; H03K 19/17756; H03K 19/017581; G06F 13/4027; G06F 13/4282; G06F 21/602; G06F 2213/0026
See application file for complete search history.

(56) References Cited

U.S. PATENT DOCUMENTS

| | | | | |
|---|---|---|---|---|
| 2002/0188910 A1* | 12/2002 | Zizzo | ..................... | G06F 30/30 716/103 |
| 2002/0199110 A1* | 12/2002 | Kean | ..................... | G06F 21/76 713/189 |

* cited by examiner

*Primary Examiner* — Seokjin Kim
(74) *Attorney, Agent, or Firm* — Fletcher Yoder P.C.

(57) ABSTRACT

Systems and methods for generating and deploying integrated circuit (IC) applications are provided. Partial reconfiguration functionality of an IC may be used to build reconfigurable application platforms that enable application execution on the IC. These apps may include partial reconfiguration bitstreams that allow ease of access to programming without cumbersome compilation via a set of complex tools. The apps may be acquired via a purchasing website or other mechanism, where the bitstreams may be downloaded to the IC, thus increasing usability of the IC as well providing addition revenue streams.

21 Claims, 3 Drawing Sheets

INTEGRATED CIRCUIT APPLICATIONS USING PARTIAL RECONFIGURATION

CROSS-REFERENCE TO RELATED APPLICATIONS

Under 35 U.S.C. § 120, this application is a continuation of U.S. patent application Ser. No. 15/425,744, entitled "Integrated Circuit Applications Using Partial Reconfiguration," filed on Feb. 6, 2017, which is a continuation of U.S. patent application Ser. No. 14/310,902, entitled "Integrated Circuit Applications Using Partial Reconfiguration," filed on Jun. 20, 2014, both of which are incorporated by reference herein in their entireties for all purposes.

BACKGROUND

The present disclosure relates generally to integrated circuits, such as field programmable gate arrays (FPGAs). More particularly, the present disclosure relates to an application ecosystem and framework for integrated circuits (e.g., FPGAs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs, according to a designer's design. Additionally, FPGAs may include input/output (I/O) logic, as well as high-speed communication circuitry. For instance, the high-speed communication circuitry may support various communication protocols and may include high-speed transceiver channels through which the FPGA may transmit serial data to and/or receive serial data from circuitry that is external to the FPGA.

In ICs such as FPGAs, there has been little ability for designers/entities to share their functionalities (e.g., as shareware and/or commercial application) with consumers. Unfortunately, as IC programmable logic designs become more complex and/or sophisticated, this silo approach may inhibit growth of the IC market, by limiting utility of the IC and/or limiting income potential for these IC devices. Further, prior attempts to share programmable logic designs have relied upon access to complex design tools and significant technical expertise (e.g., using knowledge of hardware description language, timing constraints, etc.). Accordingly, the process for using such designs is technically challenging, error-prone, and time-consuming.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for providing an ecosystem for application/application development for ICs. In particular, the present embodiments may provide platforms for integrated circuit (IC, such as FPGAs), such that applications may be executed on the ICs. Further, the present embodiments relate to software development kits (SDKs) to encourage development of these applications to be executed on the ICs. For example, in one embodiment, a platform developer may create a platform and/or an SDK for the platform. An app developer may use the SDK to generate an application for execution on an IC.

Various refinements of the features noted above may be employed in relation to various aspects of the present disclosure. Further features may also be incorporated in these various aspects as well. These refinements and additional features may be employed individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry and/or machine-readable instructions stored on a tangible, non-transitory, machine-readable medium for enabling apps to be implemented on an integrated circuit (IC). In particular, partial reconfiguration functionality of an IC may be used to build reconfigurable app platforms that enable app execution on the IC. These apps may include partial reconfiguration bitstreams that do not require compilation on the IC. The apps may be acquired via a purchasing website or other mechanism, where the bitstreams may be downloaded to the IC.

Figure 1:
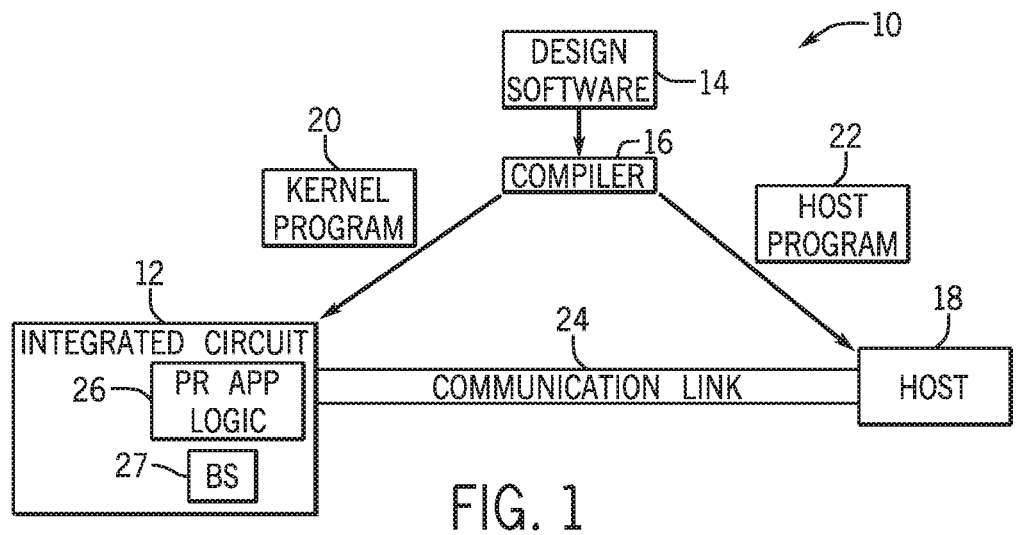
FIG. 1 is a block diagram of a system that utilizes partial-reconfiguration application logic to execute an IC-implemented program (e.g., an "app"), in accordance with an embodiment.

With the foregoing in mind, FIG. 1 illustrates a block diagram of a system 10 that utilizes adaptable logic to affect a machine-implemented program. As discussed above, a designer may desire to implement functionality on an integrated circuit 12 (IC, such as a field programmable gate array (FPGA)). The designer may specify a high level program to be implemented, such as an OpenCL program, which may enable the designer to more efficiently and easily provide programming instructions to implement a set of programmable logic for the IC 12 without requiring specific knowledge of low level computer programming languages (e.g., Verilog or VHDL). For example, because OpenCL is quite similar to other high level programming languages, such as C++, designers of programmable logic familiar with such programming languages may have a reduced learning curve than designers that are required to learn unfamiliar low level programming languages to implement new functionalities in the IC.

The designers may implement their high level designs using design software 14, such as a version of Quartus by Altera™. The design software 14 may use a compiler 16 to convert the high level program into a low level program. The compiler 16 may provide machine-readable instructions representative of the high level program to a host 18 and the IC 12. For example, the IC 12 may receive one or more kernel programs 20 which describe the hardware implementations that should be stored in the IC. The host 18 may receive a host program 22 which may be implemented by the kernel programs 20. To implement the host program 22, the host 18 may communicate instructions from the host program 22 to the IC 12 via a communications link 24, which may be, for example, direct memory access (DMA) communications or peripheral component interconnect express (PCIe) communications. In some embodiments, the kernel programs 20 and the host 18 may enable onboard application ("app") execution, through partial reconfiguration (PR) app logic 26, which may be stored on the IC 16 and controlled by the host 18. As will be described in more detail below, the host 18 (or other device) may provide one or more PR bitstreams 27 for use in conjunction with the PR app logic 26, such that certain functionalities described by the PR bitstreams 27 may be executed on the IC 12.

Figure 2:
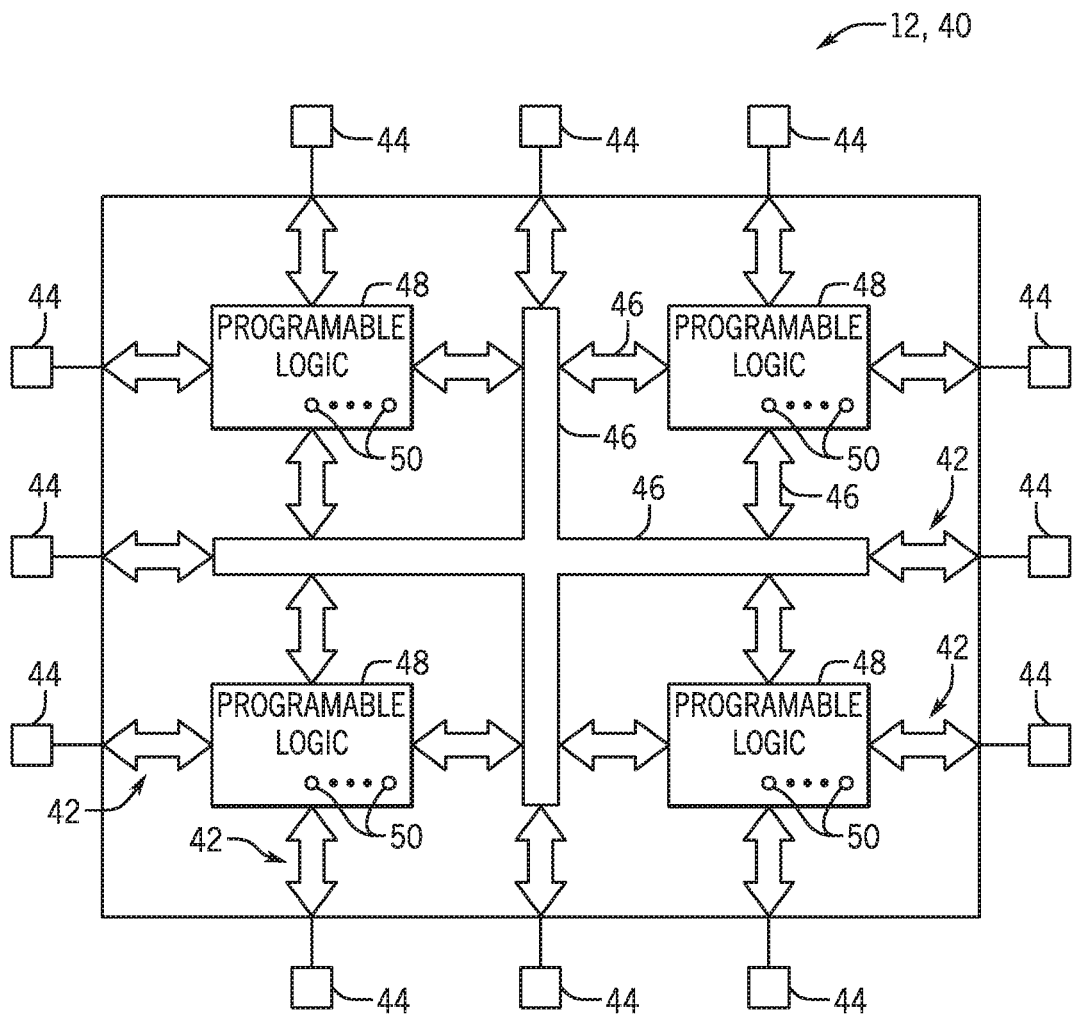
FIG. 2 is a block diagram of a programmable logic device that may include logic useful for implementing the apps, in accordance with an embodiment.

Turning now to a more detailed discussion of the IC 12, FIG. 2 illustrates an IC device 12, which may be a programmable logic device, such as a field programmable gate array (FPGA) 40. For the purposes of this example, the device 40 is referred to as an FPGA, though it should be understood that the device may be any type of programmable logic device. As shown, FPGA 40 may have input/output circuitry 42 for driving signals off of device 40 and for receiving signals from other devices via input/output pins 44. Interconnection resources 46, such as global and local vertical and horizontal conductive lines and buses, may be used to route signals on device 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48. As discussed in further detail below, the FPGA 40 may include adaptable logic that enables partial reconfiguration of the FPGA 40, such that kernels may be added, removed, and/or swapped during the runtime of the FPGA 40.

Programmable logic devices (PLDs), such as FPGA 40, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

As discussed above, the FPGA 40 may allow a designer to create a customized design capable of executing and performing customized functionalities. Each design may have its own hardware implementation to be implemented on the FPGA 40. For instance, a single hardware implementation is needed for each kernel in a design for the FPGA 40. In some instances, it may be desirable to enable predefined app execution on the FPGA 40. This is described in more detail below.

Figure 3:
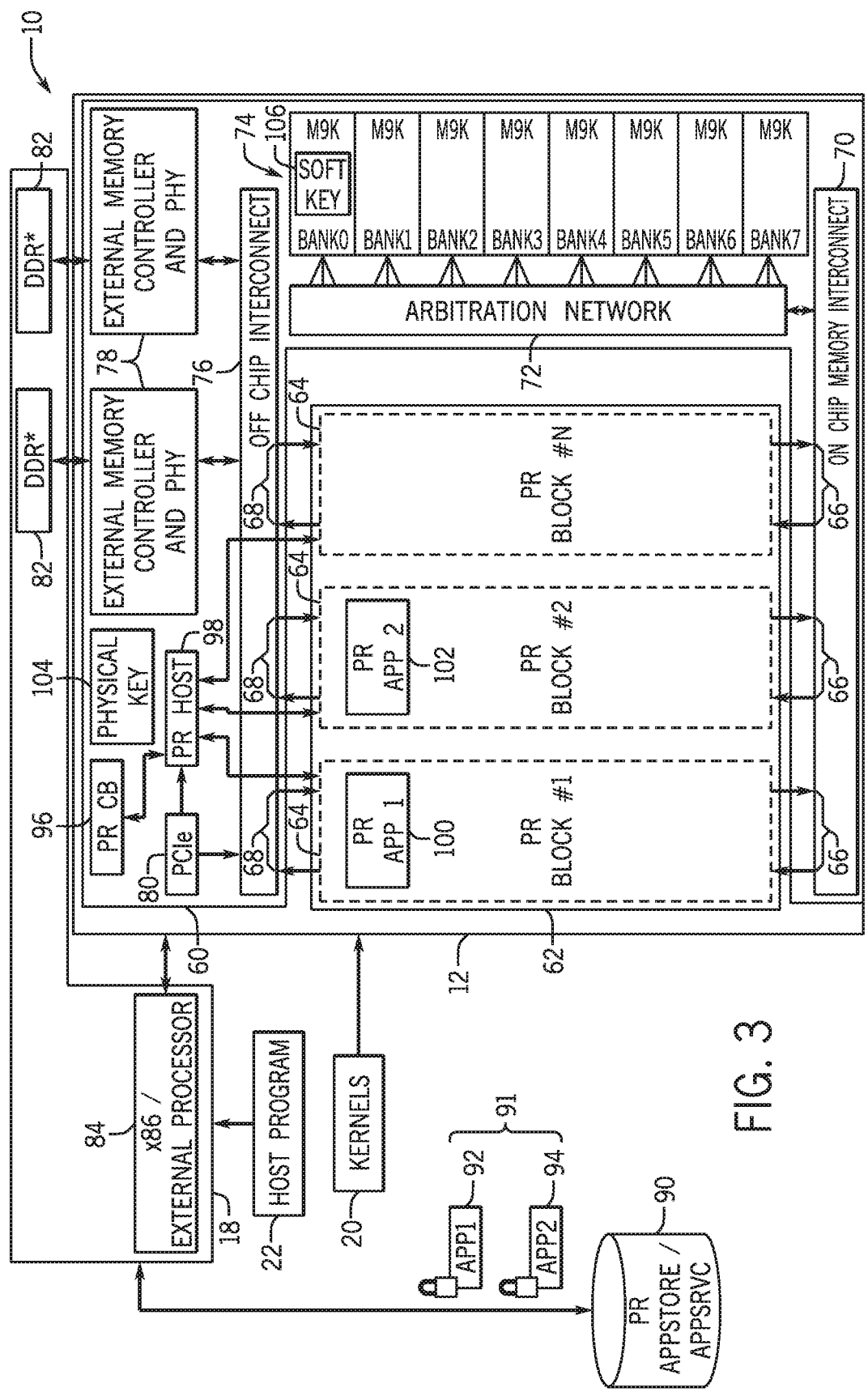
FIG. 3 is a block diagram illustrating elements of the host and integrated circuit of FIG. 1, in accordance with an embodiment.

Referring now to FIG. 3, a block diagram illustrating the system 10, further detailing elements of the host 18 and IC 12 of FIG. 1 is provided. As illustrated, the IC 12 may include fixed components 60 and configurable components 62. Some ICs, such as a Stratix® V FPGA by Altera®, provide partial reconfiguration capabilities. For example, in some embodiments, the configurable components may include a number (N) of partial reconfiguration (PR) blocks 64 stored on an IC12 (such as FPGA 40 of FIG. 2). The PR blocks 64 may provide an ability to reconfigure part of the IC 12 while the rest of the device continues to work. The PR blocks 64 may include ports to both on-chip memory interconnects and off-chip interconnects (ports 66 and 68, respectively). The PR blocks 64 are not restricted to a particular protocol, however, each of the PR blocks 64 within an IC 12 may agree on a common protocol. For example, each of the PR blocks 64 may use the Avalon® Memory-Mapped (Avalon-MM) interface, the High-speed serial interface (HS SI), the External Memory Interface (EMIF), and/or General Purpose I/O (GPIO), which may allow easy interconnect between components in the IC 12.

The size and number of PR blocks 64 may be defined by the hardware implementations and amount of programmable logic available on the IC 12. For example, as will be described in more detail below, the hardware implementations for each kernel program may be placed in a PR block 64. In certain embodiments, the hardware implementations may not span across multiple PR blocks 64. Accordingly, the size of the PR blocks 64 may be determined based upon the largest hardware implementation of the kernel programs. Sizing the PR blocks 64 in this manner may ensure that each and every hardware implementation may fit within a PR block 64. In some embodiments, each of the PR blocks 64 may be sized equally. Accordingly, the number of PR blocks 64 may be determined by dividing the amount of programmable logic devoted to non-fixed space 62 by the size of the PR blocks 64.

Turning now to a discussion of the fixed logic 60, the fixed logic 60 may include an on-chip memory interconnect 70, an arbitration network 72, local memory 74, an off-chip interconnect 76, external memory and physical layer controllers 78, and/or a PCIe bus 80. The on-chip memory interconnect 70 may connect to the PR blocks 64 over the on-chip memory interconnect ports 66 of the PR blocks 64. The on-chip memory interconnect 70 may facilitate access between the PR blocks 64 and the local memory 74 via the arbitration network 72. Further, the off-chip memory interconnect 76 may connect to the PR blocks 64 over the off-chip memory interconnect ports 68 of the PR blocks 64. The off-chip interconnect 76 may facilitate communications between the PR blocks 64 and the host communications components (e.g., the external memory and physical layer controllers 78 and the PCIe bus 80). The external memory and physical layer controllers 78 may facilitate access between the IC 12 and external memory (e.g., host 18 memory 82). Further the PCIe bus 80 may facilitate communication between the IC 12 and an external processor (e.g., host 12 processor 84).

Communications between the host 18 (or another processor) and the IC 12 may be very useful in enabling apps on the IC 12. For example, a PR app store and/or app service 90 may provide access to one or more PR apps 91 (e.g., APP1 92 and/or APP2 94). In one embodiment, the host 18 may obtain a PR app 91 from the PR app store and/or app service 90, which may be a web-based storefront or webservice, for example.

As mentioned above, the PR apps 91 may be applications that are implemented in PR bitstreams 27. The PR blocks (or regions) are regions of the IC that are dynamically controlled by a set of CRAM frames (e.g., bits stored in configuration RAM (CRAM)). The CRAM frames may be altered without impacting the functionality of other programming of the IC 12. In contrast to non-partial reconfiguration design, which reprograms an entire CRAM array when changes are made to the design, the partial reconfiguration design may dynamically reprogram one or more CRAM frames. During partial reconfiguration, a PR host 98 interacts with a PR control block 96 to implement replacement logic in one or more PR blocks/regions 64. The PR host 98 sends a freeze signal to the PR blocks/regions 64 and accommodates handshaking with the PR control block 96 so that clock, data, and other signals are implemented properly in the CRAM. While the current embodiment illustrates the PR host 98 residing internally to the IC 12, the PR host 98 may, alternatively, reside external to the IC 12.

To implement the bitstream PR apps 91, the apps 91 may be transferred to the IC 12 (e.g., via the host 18) where they are implemented in the PR blocks/regions 64. A platform may be designed for the apps 91 that may include the PCIe interface 80 along with the PR host 98. A software drive on another device (e.g., the host 18) may send the PR bitstreams 27 (e.g., APP1 92 and/or APP2 94) to the PR host 98 (e.g., via the PCIe interface 80). The PR host 98 may communicate with the PCIe interface 80 through a pre-existing interface of the IC 12 (e.g., the Avalon® Memory Mapped Interface (Avalon-MM), which is an address-based read/write interface). The PR host 98 may communicate with the PR control block 96 using a specific handshaking protocol to feed the PR bitstream 27 to the PR control block 96.

For example, APP1 92 is executed in PR Block #1, as illustrated by block 100. Further, APP2 94 is executed in PR Block #2, as illustrated by block 102. As used herein, the terms "execute" or "implement" when used in relation to a PR APP, may refer to modifying specific CRAM bits during normal device operation based upon instructions defined in an app 91 bitstream. Modifying these CRAM bits may result in behavioral changes to particular core resources (e.g., logic array blocks (LABs), memory logical array blocks (MLABs), memory blocks, digital signal processors (DSPs), core routings, spine clocks, row clocks, etc.), and/or memory-mapped interfaces, such as dynamic partially reconfigurable I/O (DPRIO) interfaces. Once loaded, these apps 91, may reconfigure the high speed serial interface (HSSI) and/or the external memory interface (EMIF) channels using general purpose I/O (GPIO) and/or dynamic partially reconfigurable I/O interfaces (DPRIO) Memory Mapped interfaces (e.g., to adjust data rates and/or cause recalibration). Apps may run simultaneously on the IC 12. For example PR APP1 100 and PR APP 2 102 may execute simultaneously. Further, one PR app may be reconfigured while other PR apps execute normally.

The apps 91 (e.g., bitstream APP1 92 and bitstream APP2 94) may include security restrictions, as illustrated by the padlocks associated with these bitstreams in FIG. 3. In one embodiment, the apps 91 may be encrypted with AES-256 or other encryption algorithm. To implement the apps 91 on the IC 12, a key may be used to decrypt the encrypted apps 91 (e.g., bitstream APP1 92 and/or bitstream APP2 94). The key may be a physical key 104 embedded in the IC 12 and/or a soft key 106 loaded onto the IC 12. In one embodiment, the physical key 104 may be factory blown fuses resulting in a programmed key on the IC 12. The soft key 106 may be machine-readable data loaded into a battery backed and/or volatile memory in the IC12 (e.g., in the PR control block 96, in the on-chip memory 74, etc.). By encrypting the apps 91, control over the apps 91 may be maintained. For example, an app 91 may be encrypted such that the app 91 is executable only on one IC 12 with a particular physical key 104 useful to decrypt the encrypted app 91. For example, the physical key 104 embedded in IC 12 may be the particular key useful for decrypting APP1 92. The physical key 104 may be unique to the IC 12. Accordingly, only the IC 12 may decrypt (and subsequently execute) APP1 92. Thus, by encrypting APP1 92 in a manner where only one key can decrypt the app, APP1 92 may be controlled to be implementable only on particular ICs 12.

Because access/implementation of the apps 91 may be controlled at the device level, many different licensing schemes may be utilized. In one embodiment, the apps 91 may be licensed under a "per-device" structure where a new license is required for each IC 12 in which the app is decrypted and/or implemented. Alternatively, the apps 91 may be licensed under a "per-user" structure where each IC 12 owned by a particular user is allowed to decrypt the apps 91.

In some embodiments, regardless of whether a "per-device" or "per-user" structure is used, a uniquely encrypted bitstream may be provided for each device. For example, each IC 12 may include a unique physical key 104 or soft key 106 that is not known by the user of the PR app store and/or app service 90. Accordingly, the PR app store and/or app service 90 (or a service in communication with the PR app store and/or app service 90) may maintain a reference to each of the user's devices as well as a private repository of key information (e.g., physical key 104 or soft key 106) associated with each IC 12. Thus, the PR app store and/or app service 90 (or other entity in communication with the PR app store and/or app service 90) may generate a unique bitstream associated with the key information of the user's devices.

Licenses may be associated with particular ICs 12 in a number of ways. In certain embodiments, the user may provide reference information for a particular IC 12 and/or set of ICs 12. For example, when purchasing a license and/or registering an IC 12, a user might input a serial number and/or unique device identifier of the IC 12. In some embodiments, reference information may be captured at a point of sale of the IC 12.

The reference information may be used to determine key information for one or more particular ICs 12. Under the "per-device" structure, a bitstream associated with one IC 12 may be generated. Under the "per-user" structure, bitstreams associated with each IC 12 associated with the user may be generated. By creating particular bitstreams for each IC 12, the key information of these ICs 12 may be used to decrypt the associated bitstreams.

In certain embodiments, the apps 91 may be licensed under shareware, commercial, industrial, military agreements, or any combination thereof. Under a shareware scheme, there may be no cost to download and use the app 91 in a platform. These apps 91 may be typically sourced by an IC manufacturer (e.g., Altera®) or a community of IC 12 users. Because there may be no cost associated with shareware apps, these apps 91 may, in some embodiments, lack encryption or other licensing control.

Under a commercial agreement, the apps 91 may be encrypted to limit access of the apps 91 to certain users and/or devices. These apps 91 may include beta and/or evaluation versions that may be time-limited. For example, design software, such as OpenCore Plus from Altera® may supplement the apps 91 with a time limitation (e.g., app 91 may run for 1 hour, app 91 may run until January 1, etc.). Further the apps 91 may include a debug version or mode that provides a standard debug interface. For example, debug versions of the apps 91 may provide a virtual joint test action group (JTAG) interface and/or an Avalon Memory Mapped interface. Such functionality may be provided as a supplement to the apps 91 via on-chip debugging tools, such as SignalTap® II Logic Analyzer available from Altera®.

Under an industrial agreement, the apps 91 may be encrypted and may meet special reliability and/or safely features. For example, certain industrial apps 91 may include a feature constraint that a region of the IC 12 be implemented by a particular set of bits. Under a military agreement, the apps 91 may have strict reliability and security standards. For example, in one embodiment, a military app 91 may include functionality that can blank the IC 12 through direct access to a secure PR host 98.

Figure 4:
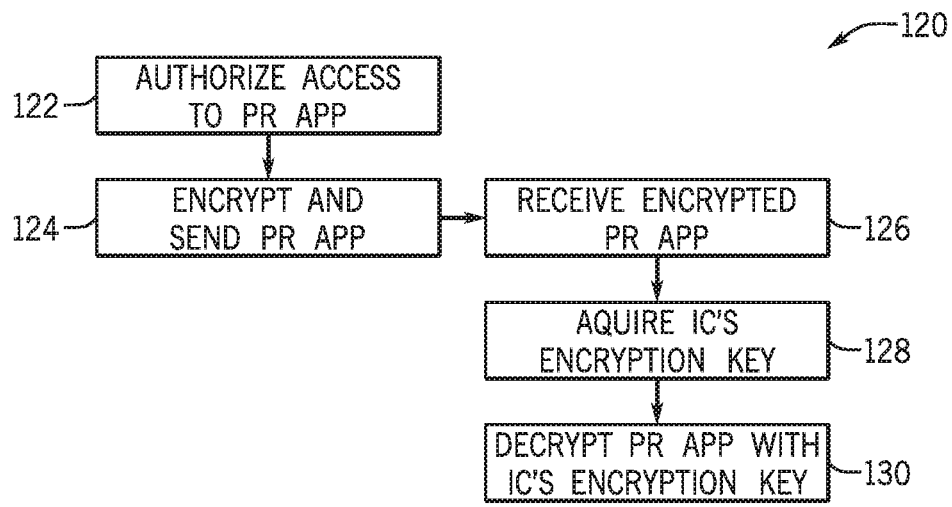
FIG. 4 is a flow chart illustrating a process for acquiring and executing apps on the IC, in accordance with an embodiment.

FIG. 4 is a flow chart illustrating a process 120 for acquiring and executing apps 91 on the IC 12, in accordance with an embodiment. Upon a user requesting an app 91 and satisfying all requirements for obtaining the app 91 (e.g., license payment), the app store/app service 90 (or other entity) may authorize access of the PR app 91 to the user (block 122). Based on the authorization (e.g., per-user license or per-device license), the PR app 91 may be encrypted sent to the IC 12 (e.g., either directly or via an intermediary processing device) (block 124). For example, in a per-user license, the app 91 may be encrypted in a manner such that each of a user's IC's 12 may decrypt the app 91. Alternatively, in a per-device license, the app 91 may be encrypted in a manner such that only one IC 12 may decrypt the app 91.

The encrypted PR app 91 is received at the IC 12 (block 126). Further, decryption keys of the IC 12 are acquired. As mentioned above, the decryption keys may be soft keys stored in memory of the IC 12 or may be hardware-based keys embedded into the IC 12. Once the keys are acquired, the PR app 91 is decrypted with the acquired key. Accordingly, only ICs 12 with a key that can decrypt the previously encrypted app 91 may access the app 91, resulting is efficient access control of the app 91.

Figure 5:
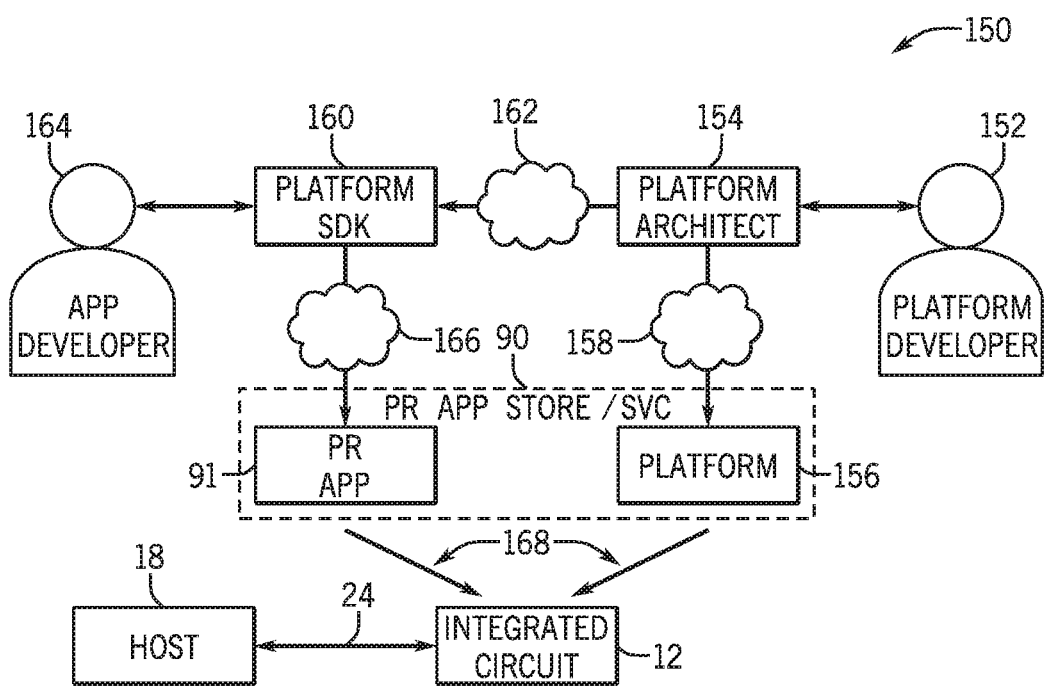
FIG. 5 is a block diagram illustrating a PR app ecosystem, in accordance with an embodiment.

Having discussed acquisition and implementation of the PR apps 91 on the IC 12, the discussion now turns to a PR app 91 development and deployment ecosystem. FIG. 5 is a block diagram illustrating a PR app ecosystem, in accordance with an embodiment. As previously discussed, a platform may be designed to enable execution of the PR apps 91 on the IC 12. In certain embodiments, a platform developer 152 may use a platform architect design system 154 (e.g., a computer processing machine-readable instructions stored on a tangible, non-transitory, machine-readable medium) to design the platform 156. The platform 156 may define interconnects and/or constraints for the partial-reconfiguration logic of the PR apps 91. For example, using the platform architect system 154, a bridge may be defined between the PCIe interface 80 and the PR application core (e.g., blocks 64), which is a location where app logic (e.g., the logic 100 and/or 102 of FIG. 3) may be placed on the IC 12. Because the apps 91 run on the application cores, the application cores should be large enough and feature-rich to handle many different implementations within a particular domain. An app 91 may only partially utilize available resources or may selectively enable particular interfaces of the PR application core.

Further, static logic and non-PR interfaces, such as: HSSI, EMIF, and GPIO interfaces may be defined by the platform 156. The platform 156 may define interfaces to the application core logic and also include logic to freeze these interfaces on demand from the PR host 98. The platform 156 may provide clock network and routing constraints as well as define and/or assign fixed physical regions on the IC 12 where the PR application core may be placed.

Upon completion of the platform design, the platform 156 may be published 158 to an app store/app service 90. Further, a software development kit (SDK) 160 for the platform 154 may be generated/published 162, such that an app developer 164 may create apps 91 for the platform 154. The SDK 160 may include information that enables an application design suite (e.g., Altera® Complete Design Studio) to generate a resultant app 91 (e.g., a bitstream). For example, the SDK 160 may include PR region definitions and/or other constraints defined in the platform (e.g., clock and routing constraints, boundary port locations, etc.). Further, a timing model for the platform 154 may be provided in the in SDK 160.

After the app 91 is generated, it may be published 166 to the app store/app service 90. A request for access to an app 91 may be detected at the PR app store/app service 90 (e.g., via a purchase and/or download request). The app store/app service 90 may validate the request and/or grant access to the app 91. Once access is granted to the app 91 (e.g., according to the process 120 of FIG. 4) the platform 156 configuration and the app 91 may be downloaded 168 to the IC 12 (e.g., through host 18 and communications link 24). Thus, the app 91 is ready for execution (e.g., bitstream driven CRAM bit modification) on the IC 12.

By implementing a partial reconfiguration application ecosystem, a vast array of applications may be developed and deployed on an integrated circuit. The addition of pre-defined applications for these ICs may increase their utility, which may result in increased popularity and demand. Further, these applications may provide additional revenue streams for IC vendors and/or application developers.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method, comprising:
providing, via a network service, a platform for implementing custom applications, wherein the platform comprises a definition of one or more constraints, defined by a platform developer, to be implemented in conjunction with a subsequently developed custom application, and wherein the platform is to be implemented in reconfigurable blocks of one or more field programmable gate arrays (FPGA);
receiving, at the network service, the custom application to be combined with the platform, wherein the one or more constraints of the platform define the one or more FPGA interfaces to be combined with the custom application, wherein the custom application is constrained to the definition when combined with the platform as a logic implementation on the one or more FPGAs; and
generating, based upon data indicative of the custom application, a set of bits, wherein the set of bits, when implemented on the one or more FPGAs, cause implementation of the platform, the FPGA interfaces, and the custom application on the one or more FPGAs.

2. The method of claim 1, comprising:
sharing, via the network service, access to the set of bits, the custom application, or both.

3. The method of claim 2, wherein the sharing is to a specific user account specified via the network service.

4. The method of claim 2, comprising:
receiving a request to purchase at least a portion of the custom application;
receiving payment for the at least portion of the custom application; and
based upon receiving the request, receiving the payment, or both, sharing, via the network service, access to the at least portion of the custom application.

5. The method of claim 1, wherein the definition defines a peripheral component interconnect express (PCIe) bus interface.

6. The method of claim 1, wherein the set of bits comprises a partial reconfiguration implementation of the custom application for the one or more FPGAs.

7. The method of claim 1, comprising:
providing, via the network service, a development kit, wherein the development kit comprises code to assist with implementing the custom application in conformity with the platform.

8. The method of claim 1, comprising:
providing, via the network service:
a virtual joint test action group (JTAG) interface, or
a reconfiguration of a high speed serial interface (HSSI), or
both.

9. The method of claim 1, wherein the platform comprises a definition of non-partial reconfiguration interfaces.

10. The method of claim 1, wherein the network service comprises a web-based storefront, a web-based service, or both.

11. A tangible, non-transitory, machine-readable medium, comprising machine-readable instructions that, when executed by one or more processors, cause the one or more processors to:
provide, via a network service, a platform for implementing custom applications, wherein the platform comprises a definition of one or more constraints, defined by a platform developer, to be implemented in conjunction with a subsequently developed custom application, and wherein the platform is to be implemented in reconfigurable blocks of one or more field programmable gate arrays (FPGA);
receive, at the network service, the custom application to be combined with the platform, wherein the one or more constraints of the platform define the one or more FPGAs interfaces to be combined with the custom application, wherein the custom application is constrained to the definition when combined with the platform as a logic implementation on the one or more FPGAs; and
generate, based upon data indicative of the custom application, a set of bits, wherein the set of bits, when implemented on the one or more FPGAs, cause implementation of the platform and the custom application on the one or more FPGAs.

12. The tangible, non-transitory, machine-readable medium of claim 11, comprising machine-readable instructions that, when executed by the one or more processors, cause the one or more processors to: generate the set of bits, wherein the set of bits, when implemented on the one or more FPGAs, cause implementation of the one or more FPGA interfaces on the one or more FPGAs.

13. The tangible, non-transitory, machine-readable medium of claim 12, wherein the definition defines a peripheral component interconnect express (PCIe) bus interface.

14. The tangible, non-transitory, machine-readable medium of claim 11, comprising machine-readable instructions that, when executed by the one or more processors, cause the one or more processors to: cause implementation of the set of bits to the one or more FPGAs.

15. A computing system, comprising:
a cloud-based network-accessible storefront configured to:
provide a platform for implementing custom applications, wherein the platform comprises a definition of one or more constraints, defined by a platform developer, to be implemented in conjunction with subsequently developed one or more custom applications, and wherein the platform is to be implemented in reconfigurable blocks of one or more field programmable gate arrays (FPGA);
receiving, at the network service, the one or more custom design applications to be combined with the platform, wherein the one or more constraints of the platform define the one or more FPGA interfaces to be combined with the one or more custom applications, wherein the one or more custom applications are constrained to the definition when combined with the platform as a logic implementation on the one or more FPGAs;

receive a request for the one or more custom applications to be implemented on the one or more field programmable gate arrays FPGAs; and upon receiving the request, cause implementation of the platform and the one or more custom applications on the one or more FPGAs, by providing a set of bits comprising constraints of the one or more custom applications to the one or more FPGAs.

16. The computing system of claim 15, comprising the one or more FPGAs.

17. The computing system of claim 15, wherein the set of bits comprises the definition of the one or more constraints for the one or more custom applications and the one or more FPGA interfaces to be combined with the one or more custom applications on the one or more FPGAs.

18. The computing system of claim 17, wherein the definition defines a peripheral component interconnect express (PCIe) bus interface.

19. The computing system of claim 15, wherein the one or more custom applications are implemented in a partial reconfiguration area of the one or more FPGAs.

20. The computing system of claim 15, comprising a design software system configured to provide a design interface for specifying the one or more custom applications.

21. The method of claim 1, wherein the platform is provided via the network service prior to generation of the custom application.

* * * * *